United States Patent [19]
Goubert et al.

[11] Patent Number: 5,481,687
[45] Date of Patent: Jan. 2, 1996

[54] METHOD FOR REDUCING THE NUMBER OF BITS IN A BINARY WORD REPRESENTING A SERIES OF ADDRESSES

[75] Inventors: Jozef A. O. Goubert, Berchem; Yves Therasse, Chastre; Bart J. G. Pauwels, Borgerhout; Raymond D. A. Wulleman, Brussel, all of Belgium

[73] Assignee: Alcatel N.V., Amsterdam, Netherlands

[21] Appl. No.: 995,973

[22] Filed: Dec. 23, 1992

[30] Foreign Application Priority Data

Dec. 23, 1991 [EP] European Pat. Off. .............. 91203392

[51] Int. Cl.$^6$ ............................ G06F 12/00; H03M 7/30; H04Q 11/04
[52] U.S. Cl. .................. 395/421.02; 341/51; 341/106; 370/58.2; 395/421.07; 395/421.1
[58] Field of Search .................................... 395/400, 200; 341/50, 51, 106; 370/92, 93, 95.1, 85.13, 58.2, 60

[56] References Cited

U.S. PATENT DOCUMENTS

| | | | |
|---|---|---|---|
| 4,654,654 | 3/1987 | Butler et al. | 340/825.5 |
| 4,933,938 | 6/1990 | Sheehy | 370/85.13 |
| 5,128,932 | 7/1992 | Li | 370/85.6 |
| 5,182,799 | 1/1993 | Tamura et al. | 395/400 |
| 5,185,860 | 2/1993 | Wu | 395/200 |
| 5,227,778 | 7/1993 | Vacon et al. | 370/85.1 X |
| 5,276,868 | 1/1994 | Poole | 395/600 |
| 5,371,499 | 12/1994 | Graybill et al. | 341/51 |
| 5,406,278 | 4/1995 | Graybill et al. | 341/51 |

OTHER PUBLICATIONS

IEE Proceedings Part E, vol. 135, No. 1, Janvier 1988, Stevenage, GB, pp. 55–59; P. Wolstenholme; 'Filtering of Network Addresses in Real Time by Sequential Decoding'.
IEE Trans. on Communications, vol. 38, No. 7, Juillet 1990, New York, US, pp. 938–942; C. Kwok et al: 'Cut–Through Bridging for CMAS?CD Local Area Networks'.
IEE INFOCOM 91; vol. 2, Avril 1991, Florida, US, pp. 515–524; Tong_Bi Pei et al: 'VLSI Implementation of Routing Tables: Tries and Cams'.
Philips Telecom and Data Systems Review, vol. 48, No. 2, Julin 1990, Hilversium, NL, pp. 15–22; W. Krick: 'ATM—A Transfer Concept Not Only for Broadband Services'.

Primary Examiner—Michael A. Whitfield
Attorney, Agent, or Firm—Ware, Fressola, Van Der Sluys & Adolphson

[57] ABSTRACT

A method for reducing the number of bits in a binary word (AI) which represent a series of addresses, called initial addresses, having a first step (E1) which successively extracts from each initial address (AI) at least one bit (C1) with a fixed rank; forms (1) an address called the selection address (AS) from each bit or bits (C1); extracts from each initial address (AI) a series of bits (C3, C6) using a format (M1i) selected from multiple predetermined first formats (M11, M12, M13, M14), as a function of the selection address; forms (2) with this series of bits (C3, C6) a binary word called the first relative address (AV1); and adds this first relative address to an address called the predetermined basic address (AB(M1i)) associated with the format (M1i) selected to determine this first relative address so as to obtain an address called the first reduced address (AT1) having a smaller number of bits than the initial address (AI); and wherein the basic address (AB(M1i)) associated with the one (M1i) in the first formats, consists of successively considering the first formats; taking 0 for the basic address associated with the first format considered from the first formats; and taking for the value of each basic address associated respectively with the other first formats, the sum of the last basic address determined for the previously considered first formats, and the maximum relative address value which can be obtained using the last previously considered first format incremented by one unit.

5 Claims, 4 Drawing Sheets

METHOD FOR REDUCING THE NUMBER OF BITS IN A BINARY WORD REPRESENTING A SERIES OF ADDRESSES

TECHNICAL FIELD

The invention is for a method to reduce the number of bits in a binary word which represents a series of addresses.

BACKGROUND OF THE INVENTION

A series of addresses is frequently represented by a binary word which has a number of bits that is much greater than the number of bits strictly needed to encode all the addresses in the series. For instance, in the telecommunications field, each cell employed to transmit data via an asynchronous time division multiplexing telecommunications network includes a header which is standardized by the CCITT and formed by a large number of bits that enable, among other things, the identification of a communication associated with the cell. At the interface between two nodes in the telecommunications network, this header includes: twelve radial link identification bits, sixteen channel identification bits, and four channel attribute bits. Each radial link, consists of a set of channels which can be considered and processed as a single entity by a node in the network, or processed channel by channel, for instance to route the associated communications in different directions. The four channel attribute bits enable, among other things, a distinction to be made between different types of data which can be routed through the same channel, for example: data generated by a user, or maintenance data.

The value assigned to each of these thirty-two bits is valid only for a link between two nodes in the network. When passing through each node in the network, this value may be changed and replaced by a value which is read in a table called a translation table. The aforementioned thirty-two bits and a number designating a node input link are used to access this translation table. The table provides: a new value for the thirty-two bits of the header; a number which designates a node output link and, subsidiarily, information used locally for cell processing. This information includes signalling information which corresponds to each cell and is transmitted in parallel to the cell.

At the interface between two nodes in the network, the header enabling a communication to be identified includes 32 bits; it is therefore possible to identify $2^{28}$ different communications and distinguish 24 different attributes for each channel. At the interface between a user and the network, the identification field of a radial link includes only eight bits, the identification field of a channel includes sixteen bits, and the channel attribute field includes four bits. It is therefore possible to distinguish $2^{24}$ different communications, and it is possible to distinguish 24 different attributes for each channel. In addition, the number of the node input link enables the channels which arrive at different links, to be distinguished. In practice, the addressing capacity provided by the standardized header is far in excess of the number of channels which actually arrive at a node. This excess entails serious drawbacks for the provision of a memory containing the translation table if the thirty-two bits, or the twenty-eight bits, of the header are to be used directly as a read-write address. It is highly inefficient to provide a decoder with thirty-two or twenty-eight input bits to address a memory which only has to contain a relatively small-number of words, for example four kilo-words, because its complexity would be disproportionate to the low capacity of the memory.

One known solution is to use a series of bits extracted from the radial link identification field and the channel identification field for the addressing. The format of this series is predetermined and its number of bits is lower than the total number of bits for the radial link identification field and for the channel identification field, for example 14 or 16 bits instead of 28 or 32 bits. The disadvantage of this method is that it restricts the freedom of a network operator when selecting the values of the radial link identification fields and the channel identification fields.

Another solution is to use a memory which can be addressed by contents to convert all of the bits in the radial link identification field and the channel identification field. If these fields have a total of 32 bits, this memory must therefore include a 32-bit address input. It includes an output which provides 12-bit-encoded addresses if, for example, the number of radial links or channels to be distinguished is equal to 4096. This conversion memory must then include 4096 32-bit registers and 4096 32-bit comparators, each register containing one of the expected values for the radial link identification field and for the channel identification field. This memory must also include a masking device such that, for each value stored in the memory, the device masks specific bits of the initial address. In the present state of technology, such a memory would be very expensive to make and could not be incorporated into a single integrated circuit.

A third solution is to compute, using a processor, an address with a reduced number of bits relative to an initial address of 28 or 32 bits. This solution however is not applicable for the translation of cell headers In an asynchronous time division multiplexing telecommunications network because of the very high binary data rate which does not leave enough time to perform such a computation.

SUMMARY OF THE INVENTION

The purpose or the invention is a method which will reduce The number of bits in a binary word that forms the read-write address of such a translation memory without restricting, a priori, the freedom of choice for the values of these fields; which can be implemented using readily integratable conventional electronic components; and which can be implemented at a high speed that corresponds to the binary data transmission rate in an asynchronous time division multiplexing telecommunications network.

The object of the invention is a method to reduce the number of bits in a binary word which represents a series of addresses, called the initial address, characterized in that it includes at least one first step consisting successively of:

extracting from each initial address at least one bit having a fixed rank;

forming an address called the selection address with the above bit or bits;

extracting from each initial address a series of bits using a format selected from multiple predetermined first formats, as a function of the selection address;

forming with the above series of bits a binary word called the first relative address; and adding this relative address to an address called the basic address, which is predetermined and associated with the format selected to determine the relative address; so as to obtain an address called the first reduced address with a smaller number of bits than that of the initial addresses;

and wherein, to predetermine a basic address associated with one of the first formats, it consists of:

successively considering the first formats;

taking 0 for the basic address associated with the first format considered among the said first formats; and taking for the value of each basic address associated respectively with the other first formats the sum of the last basic address determined for the previously considered first formats, and the maximum relative address value which can be obtained using the last previously considered first format incremented by one unit.

The method characterized above yields addresses with a smaller number of bits than that of the initial addresses because the series of reduced addresses is closer than the series of initial addresses to a series of values that increases in increments of one unit, which is the optimum form to minimize the number of bits needed to represent these addresses. For example, when a series of addresses includes a number of values between 2q–1 and 2q, the optimum number of bits to represent this series of addresses is equal to q–1, and the optimum form of this series of addresses is a series of consecutive values, for example starting from 0. If the initial addresses are encoded with a number of bits greater than q–1, we can observe that some groups of bits in the header do not take all the possible binary values, and that for each value taken by a given group of bits, the other bits take values which define a subset of address values which may be continuous or discontinuous but which is usually separated from the other subsets by large empty intervals which correspond to the values that the considered group of bits never takes.

The method according to the invention, in its first step, enables at least some empty intervals between the above-mentioned subsets to be eliminated. Determining a series of relative addresses for each subset makes it possible to take advantage of the continuity or the relative continuity of the initial addresses which form the subsets. Adding a basic address to the relative addresses determined for each subset amounts to translating all the values of initial addresses in a subset so as to reduce or eliminate the interval between two consecutive subsets.

Now let us consider the bits other than those of the given group considered for the first step. Among these other bits, let us consider a given group of bits which does not take all the potential values. If such a group exists, this means that each of the subsets considered during the first step is itself formed by sub-subsets of address values separated by empty intervals.

A second step in the method according to the invention is equivalent to translating sub-subsets of reduced addresses to reduce or eliminate at least some of the empty intervals that separate them.

These sub-subsets may themselves be discontinuous. The number of steps in the method may be increased if the distribution of the initial address values allows, until a number of bits equal to the optimum number of bits is obtained, to represent the series of addresses.

In general, in addition to the first step, the method according to the invention includes n–1 successive steps, where n is equal to at least 2; and the jth step, where j ranges from 2 to n, consists successively of:

extracting from each initial address a jth series of bits according to a format selected from multiple predetermined jth formats such that this jth series will have a number of bits less than the one with the reduced addresses provided by the j–1th step; the format being selected using a reduced address provided by the j–1th step;

forming with this jth series of bits a binary word called the jth relative address; and adding this jth relative address to an address, called the basic address, which is predetermined and associated with the format selected so as to obtain a jth reduced address which will replace the initial address and have a number of bits smaller than that of the j–1th reduced address;

wherein to predetermine the basic address associated with one of the jth formats, it consists of:

successively considering the jth formats;

taking 0 for the basic address associated with the first format considered among these jth formats; and taking for the value of each basic address associated respectively with the other jth formats the sum of the last basic address determined for the previously considered jth formats, and the maximum relative address value which can be obtained using the considered format incremented by one unit.

The basic addresses selected in this way are such that the series of reduced addresses obtained with each basic address has no values in common with the series of reduced addresses obtained with the basic addresses associated with the other jth formats.

A special technique is employed to reduce the number of bits in an initial address formed by a link number and a cell header for asynchronous time division multiplexing transmission. A first alternative of this technique, which considers in the header only the radial link and channel identification fields. This method is used to reduce the number of bits in an initial address formed by a link number and an asynchronous time division multiplexing transmission cell header, where the header includes: a virtual radial link identification field (VPI), a virtual channel identification field (VCI), and a channel attribute field (CA); each radial link being a set of channels; characterized in that it includes at least two steps (E'1, E'2); and wherein to form each selection address (AS'), it consists of extracting from each initial address (AI') the link number (LI); to form each first relative address (AT'1), it consists of extracting from each initial address (AI') a series of bits (n0, n2) which belong to the radial link identification field (VPI); to predetermine the first basic addresses (AB1') associated respectively with first formats (MF1') which correspond respectively to the selection addresses (AS'), it consists of directly taking the selection addresses (AS') by joining to them bits of lesser significance and value 0 (0000 0000); and to form each second relative address (AV'2), it consists of extracting from each initial address (AI') a series of bits (n3, n5) which belong to the virtual channel identification field (VCI). A further technique presents another alternative which also considers the channel attribute field in the header. This alternative is characterized in that it also includes a third step (E3'); and wherein to form each third relative address (AV3'), it consists of extracting from each initial address (AI') a series of bits (b1, b2) which belong to the channel attribute field (CA).

BRIEF DESCRIPTION OF THE DRAWINGS

The invention will be better understood and other details will be apparent from the following description and the associated figures.

BEST MODE FOR CARRYING OUT THE INVENTION

Figure 1:
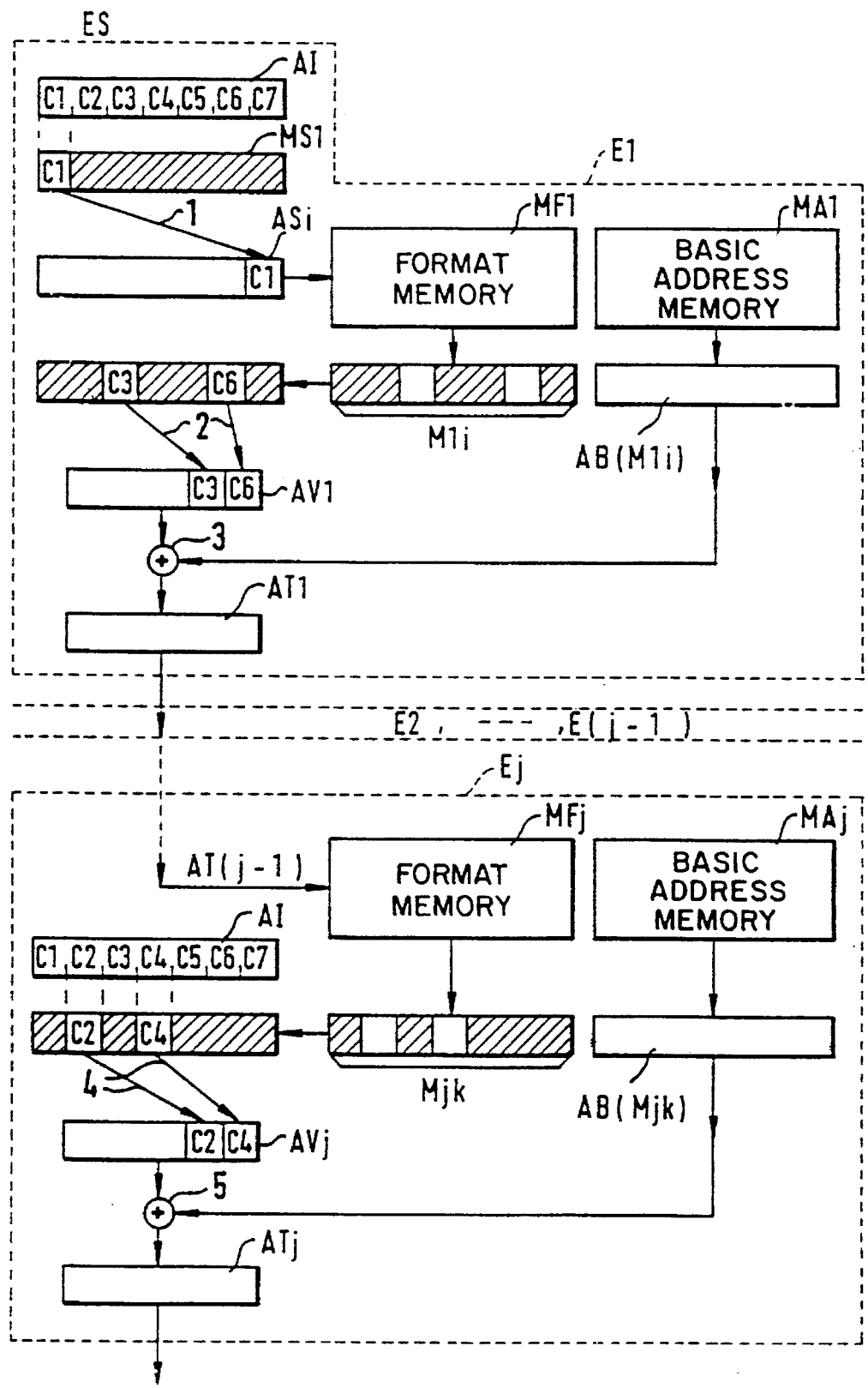
FIG. 1 shows the first and the jth step of a general technique for applying the method according to the invention.

FIG. 1 shows the first step E1 and the jth step Ej of a general technique for applying the method according to the invention to reduce the number of bits in a binary word AI which represents a series of initial addresses. For example, this binary word includes 28 bits which are referenced half-byte by half-byte with the references C1, . . . C7.

The first step E1 consists initially in extracting a series of bits from the initial address by masking the other bits using a predetermined mask MS1. For example, the mask MS1 extracts the four bits of the half-byte C1. It then consists in forming with the extracted bits a bit called the selection bit, ASi. To do this, the extracted bits are compressed by the operation referenced 1, that is, they are made consecutive within the stages of a register. The selection address ASi is used to address simultaneously two memories MF1 and MA1 called respectively the format memory and the basic address memory. Memory MF1 contains several masks M1i, each of which defines a predetermined format that corresponds respectively to one of the various potential values in the selection address ASi. Memory MA1 contains several basic addresses designated AB(Mli), each of which corresponds respectively to one of the values of the selection address ASi. In this example, if the half-byte C1 forming the selection address can actually take sixteen values, i takes the values 1 to 16.

Each mask M1i includes 28 bits in this example and enables a series of bits to be extracted from the initial address AI. For example, it permits extraction of the half-bytes C3 and C6 by masking all the other bits, if it is found that these two half-bytes encode a continuous set of 256 addresses. The half-bytes C3 and C6 are compressed by the operation referenced 2 to form a binary word called the first relative address AV1 which, in this example, takes all the values from 0 to 255. The relative address AV1 is added, through the operation referenced 3, to the basic address AB(Mli) provided by memory MA1 to obtain an address called the first reduced address AT1. The reduced address AT1 includes a number of bits which depends mainly on the number of bits in the basic address AB(Mli) and which is usually greater than the one in the variable address AV1. The number of bits in the reduced address AT1 is always less than the one in the initial address AI.

The determination of a basic address AB(M1i) associated with one of the first formats M1i consists of:

considering successively the first formats M1i in any order;

taking 0 for the basic address associated with the first format considered among the said first formats; and taking for the value of each basic address associated respectively with the other first formats the maximum reduced address value which can be obtained using the previously considered first formats incremented by one unit.

In practice, this maximum reduced address value is computed by adding the last basic address determined for the previously considered first formats, and the maximum relative address value which can be obtained using the considered format.

Figure 2:
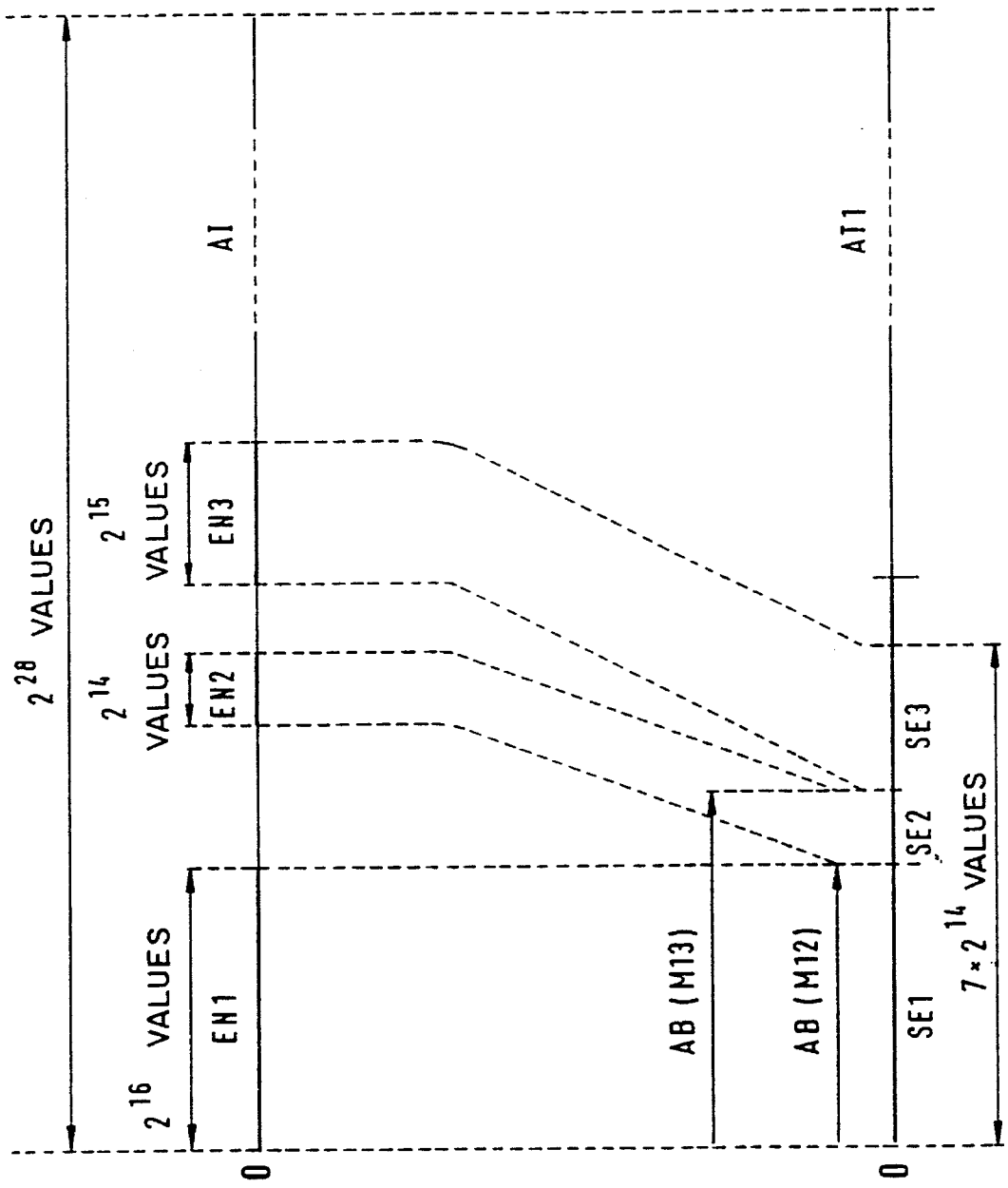
FIGS. 2 and 3 illustrate respectively a first and second step in this application for an example of a series of initial addresses.

FIG. 2 illustrates this first step E1 of the application technique shown in FIG. 1. The first line in FIG. 2 shows all of the $2^{28}$ values of the initial address which can be encoded using the 28 bits which represents a series of initial addresses AI. In this example, there are only $7 \times 2^{14}$ address values actually encoded by these twenty-eight bits. These actually encoded values are associated, for example, with three subsets EN1, EN2 and EN3 which include respectively $2^{16}$, $2^{14}$ and $2^{15}$ consecutive values, these subsets being separated by empty intervals which correspond to values that can be encoded but are not used as addresses. To illustrate the first step E1, each subset is assumed to be continuous, that is, formed by a series of consecutive values, but this is only a specific case. The first subset commences at value 0. The first and second set are separated by an empty interval which corresponds to $2 \times 2^{14}$ values. The second and third subsets are separated by an empty interval which corresponds to $2^{14}$ values.

The first step in the method according to the invention relates a continuous set of reduced address values AT1 composed of three joined subsets SE1, SE2 and SE3 to the three separate subsets of initial address values AI. The initial address values AI associated with subsets EN1, EN2 and EN3 are encoded respectively by the changes in value of three series of AI bits including respectively 16, 14 and 15 bits.

As shown in FIG. 1, these three series of bits may be extracted respectively using three masks: M11, M12 and M13.

| MASK | VPI | | |
|------|-----|---|---|
| MS1 | \|0000\|0000\|1111 | \|0000\|0000\|0000\|0000\| | |
| M11 | \|0000\|0000\|0000 | \|1111\|1111\|1111\|1111\| | |
| M21 | \|0000\|0000\|0000 | \|0011\|1111\|1111\|1111\| | |
| M31 | \|0000\|0000\|0000 | \|0111\|1111\|1111\|1111\| | |

The values taken by these three series of bits form three series of overlapping relative addresses AV1: 0 to $2^{16}-1$; 0 to $2^{14}-1$; 0 to $2^{15}-1$. These three series of relative address values AV1 have to be translated to obtain three series of reduced address values AT1, which do not have any common values, and which are joined, if this is feasible.

It should be noted that all the series of relative addresses commence with the value 0 because it would be useless to extract from the address AI any bits of constant value, that is, which would never take the value 0 and would therefore remain at the value 1.

The three values of the selection address ASi select respectively the three masks M11, M12 and M13, and three basic address values, AB(M11), AB(M12) and AB(M13), which are used to translate three series of relative address values AT1.

The first series of relative address values considered is, for example, the one which corresponds to the initial addresses AI of the subset EN1. It does not have to be translated because it commences with the value 0. The basic address AB(M11) is therefore taken equal to 0. The reduced address values AT1 which correspond to the initial addresses AI of the subset EN1 therefore range from 0 to $2^{16}-1$. This is the subset SE1 in FIG. 2.

The second series of relative address values considered is, for example, the one which corresponds to the initial addresses AI of the subset EN2. It needs to be translated from $4 \times 2^{14} = 2^{16}$ to be joined with the largest previously obtained reduced address value, since this series commences with the value 0. The basic address AB(M12) is therefore taken equal to $2^{16}$. The reduced address values AT1 which correspond to the initial AI addresses of subset EN2 therefore range from $2^{16}$ to $2^{16} + 2^{14} - 1 = 5 \times 2^{14} - 1$. This is the subset EN2 in FIG. 2.

The third series of relative address values considered is then, for example, the one which corresponds to the initial addresses of subset EN3. It needs to be translated from $5 \times 2^{14}$ to be joined with the largest previously determined reduced address value, since this series commences with the value 0. The basic address AB(M13) is therefore taken equal to $5 \times 2^{14}$. The reduced address values AT1 which correspond to the initial addresses AI of subset EN3 therefore range from $5 \times 214$ to $5 \times 214 + 215 - 1 = 7 \times 214 - 1$. This is the subset SE3 in FIG. 2.

In this example, the sets EN1, EN2 and EN3 correspond to increasing initial address values and are considered successively in this order to obtain reduced addresses which increase in the same order. This is an application technique which is preferred, but not compulsory, for the method according to the invention.

In this very simple example, a single step is adequate to obtain a continuous series of reduced addresses AT1 because each subset EN1, EN2 and EN3 of initial address values is assumed to be continuous. More steps would usually be necessary to achieve the smallest possible number of bits, if these subsets were not continuous.

As shown in FIG. 1, the jth step of the general application technique, where j is at least equal to 2, first consists in using the reduced address AT(j-1) provided by the j-1th step as an address to address in read mode a format memory, MFj, and a basic address memory, MAj. Memory MFj provides, for example, a predetermined mask Mjk which defines a format to extract a series of bits from the initial address AI. Memory MFj stores p different masks Mj1, ... ,Mjp, the number p being usually much smaller than the number of potential values for the reduced address AT(j-1). Memory Maj provides a basic address AB(Mjk) which corresponds to the mask Mjk. Mask Mjk permits extraction from the initial address AI of a series of bits which is formed, for example, by two half-bytes C2 and C4.

In general, during the jth step, the series of bits extracted from the initial address AI includes a number of bits which is less than that of the reduced address AT(j-1) provided by the j-1th step because this series of bits is selected so that its changes in value represent a subset of consecutive values for the set of values in the j-lth reduced address. Furthermore, this subset always includes less values than the set. In this example, mask Mjk permits extraction of 8 bits from the initial address. These eight bits are compressed by the operation referenced 4 to obtain a binary word which forms a relative address AB(Mjk) that is added by the operation referenced 5 to the basic address AB(Mjk) provided by memory MAj. This addition provides a jth reduced address (ATj) with a number of bits smaller that of the jth reduced address AT(j-1).

The basic addresses AB(Mjk), where k=1, ... ,p, are associated respectively with the formats defined by the predetermined masks Mjk, and are chosen such that the series of reduced addresses ATj obtained for each value j from 1 to p, has no value in common with the series of reduced addresses obtained with the basic addresses associated with the other jth formats defined respectively by the masks Mj1, ... , Mjk-1, Mjk+1, ... , Mjp. The number p of the jth formats depends on the way in which the initial address values are distributed. The basic address AB(Mji) is taken equal to 0 for the first mask considered among the masks Mij for a fixed value of j; and is taken equal to the maximum value of the reduced addresses previously obtained, for other masks Mji, for the same value of j, by incrementing this maximum value by one unit.

This maximum value of the reduced addresses which can be obtained using the other previously considered masks, for a fixed value of j, is computed by adding the last basic address value computed for these jth masks, if any, and the maximum relative address value which can be obtained using the considered mask, that is, the maximum value of the series of bits extracted using this mask and then compressed. If the first basic address for this value of j is considered, it is taken equal to 0.

Figure 3:
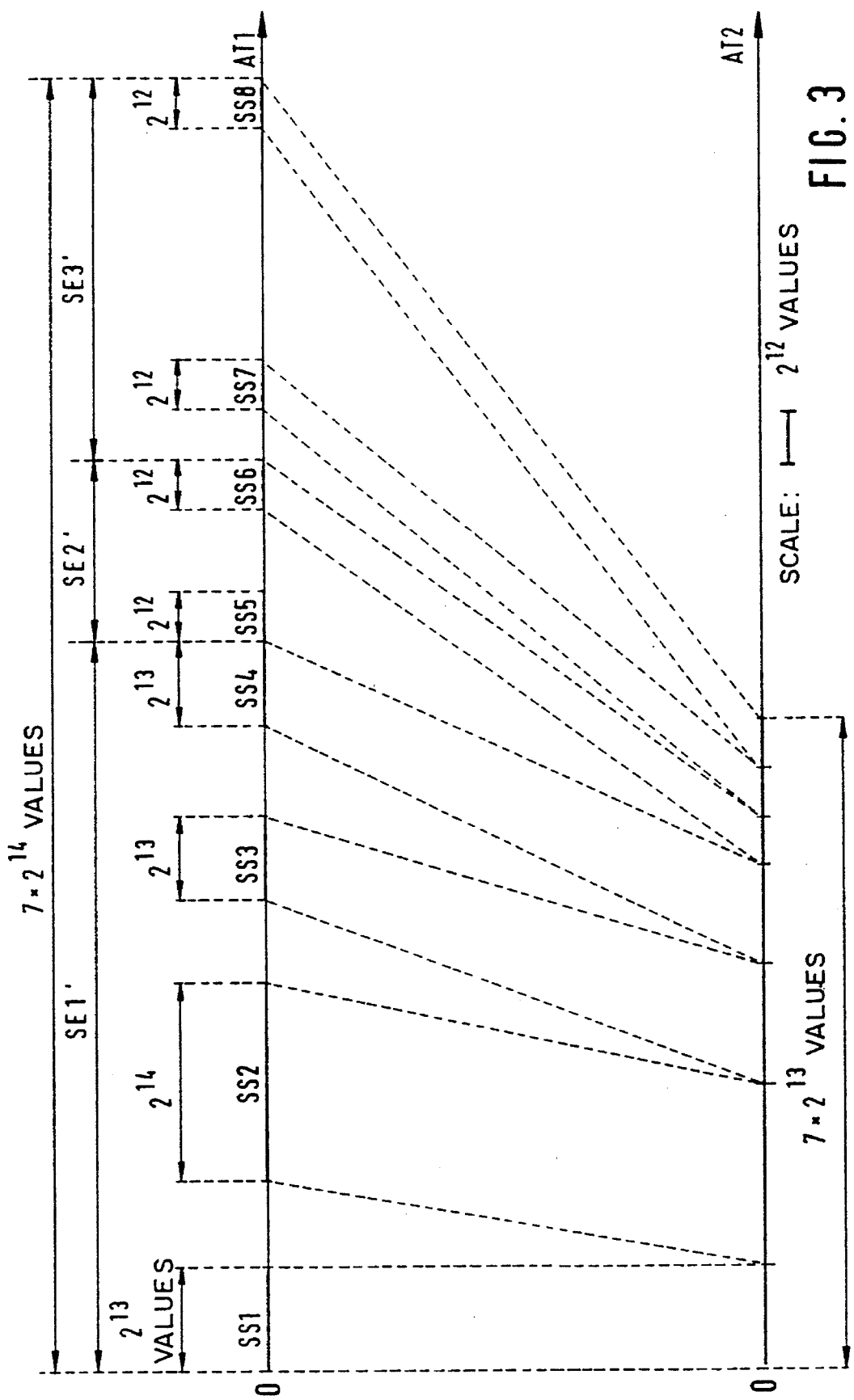

FIG. 3 gives an example of the use of the jth step Ej where j=2, for an example similar to the one illustrated in FIG. 2, but considering thereafter subsets which are not formed each by a series of consecutive values. The first line in FIG. 3 represents three subsets SE1', SE2' and SE3' of reduced address values AT1 obtained by translations during a first step similar to the one described with reference to FIG. 2, and which eliminated the empty intervals between these three subsets.

The reduced addresses AT1 are encoded in 17 bits, but their values range only from 0 to $7 \times 2^{14} - 1$ in this example. Furthermore, these values do not span this interval continuously. The reduced address AT1 actually takes only $7 \times 2^{13}$ values which are grouped in eight sub-subsets, SS1 to SS8, including respectively: $2^{13}$, $2^{14}$, $2^{13}$, $2^{13}$, $2^{12}$, $2^{12}$, $2^{12}$ and $2^{12}$ consecutive values.

These sub-subsets are separated by empty intervals which correspond to potential values that are however not used to form addresses. The subsets SE1', SE2' and SE3' do not all have the same number of values. In this example, the first value of the sub-subset SS1 is 0; it therefore does not need to be translated.

Let us consider as an example the processing of sub-subsets SS1 to SS4 by the second step E2 of the method according to the invention. Of all these values in the reduced address AT1 provided by the first step E1, the ones which belong to the subset SS1 enable a mask M21 to be read in a format memory MF2. The latter permits extraction from the initial address AI of a series of bits to form a relative address AV2. Mask M21 is chosen so as to obtain a value of the relative address AV2 for each value of the reduced address AT1, and such that all the relative address values AV2 which correspond to the reduced address values of the sub-subset SS1 are different from each other. Similarly, masks M22 to M28 are read in memory MF2 for the reduced addresses AT1 of the sub-subsets SS2 to SS8 respectively.

Each reduced address AT1 also enables a basic address to be read in a basic address memory, MA2. Memory MA2 provides: a basic address AB(M21) for all the reduced addresses AT1 which correspond to the sub-subset SS1; a basic address AB(M22) for all the reduced addresses AT1 which correspond to the sub-subset SS2; a basic address AB(M22) for all the reduced addresses AT1 which correspond to the sub-subset SS3; and a basic address AB(M23) for all the reduced addresses AT1 which correspond to the sub-subset SS4.

For example, mask M21 enables a series of 13 bits to be extracted from the initial address AI to form $2^{13}$ consecutive values of relative address AV2 which correspond respectively to $2^{13}$ consecutive values of reduced address AT1 in the sub-subset SS1.

The values of relative addresses AV2, for SS1, range from 0 to $2^{13}-1$, like the reduced address values AT1 for this example in sub-subset SS1. Since the relative address values AV2 have 0 for their minimum value, it is not necessary to translate them. The basic address AB(M21) is therefore taken equal to 0. The reduced addresses AT2 obtained for SS1 therefore range from 0 to $2^{13}-1$.

Mask M22 enables the initial address AI to be extracted from a series of 14 bits to form $2^{14}$ consecutive relative address values AV2 which correspond respectively to $2^{14}$ consecutive reduced address values AT1 in sub-subset SS2. The relative address values AV2, for SS2, range from 0 to $2^{14}-1$, while the corresponding reduced address values AT1 range from $2^{14}$ to $2^{15}$. To obtain reduced address values AT2 joined with those obtained previously for SS1, the relative address values AV2 obtained for SS2 must be translated by adding to them the maximum value, $2^{13}-1$, of the reduced addresses AT2 obtained for SS1 plus one unit. The basic address AB(M22) is therefore taken equal to $2^{13}$. The reduced addresses AT2 obtained for SS2 therefore range from $2^{13}$ to $3\times2^{13}-1$.

Mask M23 enables a series of 13 bits to be extracted from, the initial address AI to form $2^{13}$ consecutive values of relative address AV2 which correspond respectively to $2^{13}$ consecutive values of reduced address AT1 in the sub-subset SS3. The relative address values AV2, for SS3, range from 0 to $2^{13}-1$, while the corresponding reduced address values AT1 range from $5\times2^{13}$ to $3\times2^{14}-1$. To obtain reduced address values AT2 joined with those obtained previously for SS2, the relative address values AV2 obtained for SS3 must be translated by adding to them the maximum value, $3\times2^{13}-1$, of the reduced addresses AT2 obtained for SS2, plus one unit. The basic address AB(M23) is therefore taken equal to $3\times2^{13}$. The reduced addresses AT2 obtained for SS3 therefore range from $3\times2^{13}$ to $2^{15}-1$.

Mask M24 enables a series of 13 bits to be extracted from the initial address AI to form $2^{13}$ consecutive relative address values AV2 which correspond respectively to $2^{13}$ consecutive values of reduced address AT1 in the sub-subset SS4. The relative address values AV2, for SS4, range from 0 to $2^{13}-1$. The basic address AB (M24) is taken equal to 215. The reduced addresses AT2 obtained for SS4 therefore range from 215 to $5\times2^{13}-1$.

Thus the reduced addresses AT2 obtained for all the sub-subsets SS1, SS2, SS3 and SS4, after translation, have consecutive values as represented in the first line of FIG. 3. This is also the case for the sub-subsets SS5 to SS8 of the subsets SE2' and SE3' after the second step of the method according to the invention has been applied to them, in a way similar to that described above for the sub-subsets SS1 to SS4 which form the subset SE1'. All of the reduced addresses AT2 obtained for the three subsets SEI' to SE2' include $7\times2^{13}$ consecutive values and can therefore be encoded using a 16-bit binary word while the initial address AI is encoded using a 28-bit binary word.

Naturally, if the sub-subsets SS1, etc, are not formed by consecutive values as assumed, it would be possible to carry out a third step E3 similar to step E2 to eliminate the empty intervals which correspond to potential values that are not used for addresses.

Figure 4:
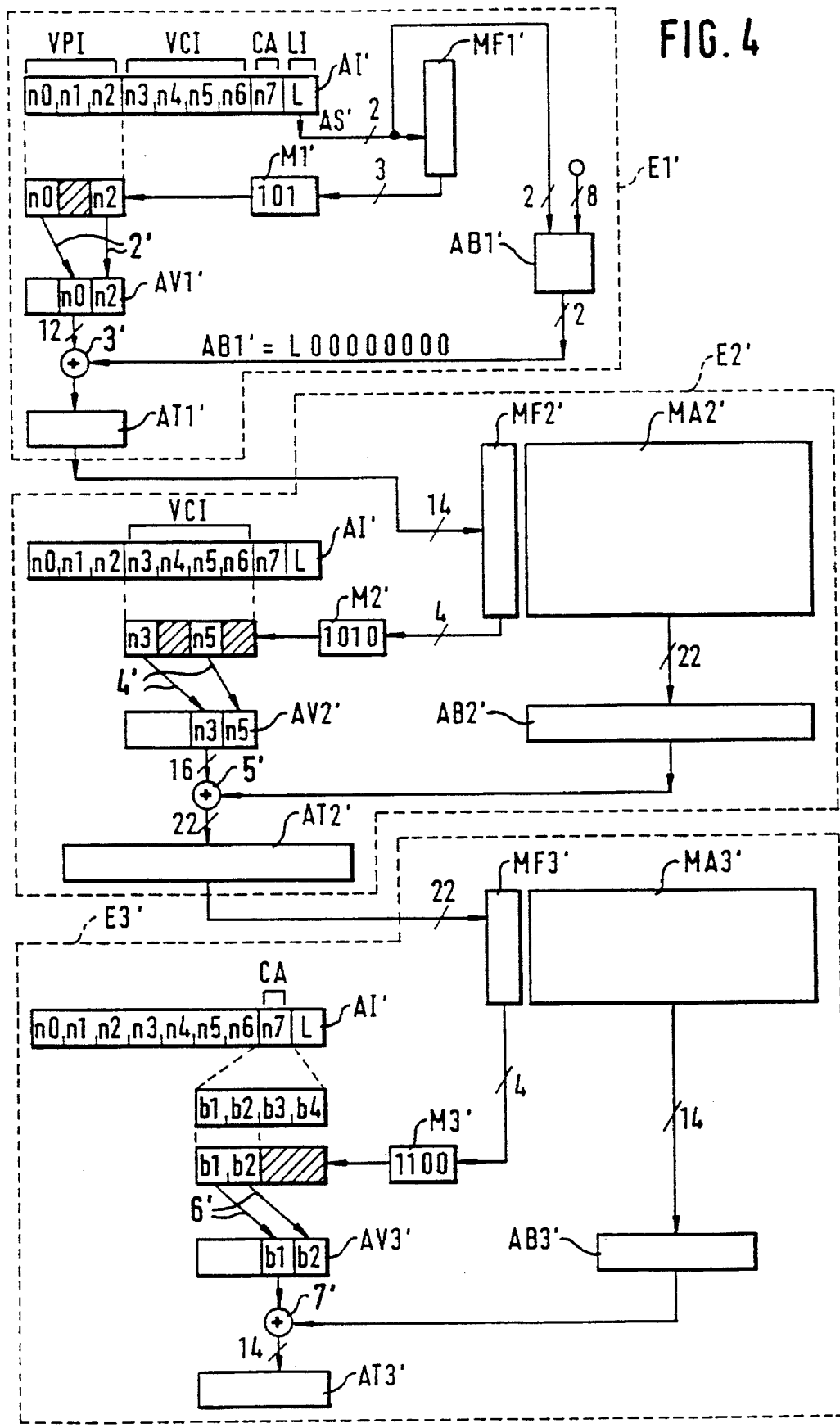
FIG. 4 illustrates an example of application of the method according to the invention which includes two steps and is applied to initial addresses, each of which is formed by a link number and a cell header for asynchronous time division multiplexing transmission.

FIG. 4 shows the application of the method according to the invention to reduce the number of bits to address a translation memory in a link of an asynchronous time division multiplexing telecommunications network. For example, the cells are considered at the interface between two nodes in the network. Consequently, the header of each cell includes: twelve bits which form a radial link identification field, VPI; sixteen bits which form a channel identification field, VCI; and four bits which form a channel attribute field, CA. An initial address AI' is formed from the fields mentioned above, which have been extracted from the header of each cell, and from a field LI formed by two bits which identify the link on which a cell arrives at the input of the considered node.

In this example, each link can receive headers which can each take 16 different values in the VPI field, while this field can encode up to $2^{12}$ values. Furthermore, for each value of the VPI field, a number of bits in the VCI field are used to represent, addresses which identify channels and the other bits of the VCI field remain unused. The determination of the masks and basic addresses for each step in the method derives from the values used and from the values unused by the network operator, and also derives from the hierarchy of the various fields that form the address, this hierarchy being imposed by the standards which define the cell header. The hierarchical order is as follows:

the potential values for the link number field LI;
the potential values for the radial link identification field VPI;
the potential values for the channel identification field, VCI, for each radial link; and
the potential values for the channel attribute field CA.

Usually there is a series of consecutive values in the VPI field for each value of the LI field. Usually there is a series of consecutive values in the VCI field, for each value of the VPI field. In other words, a link usually receives several radial links each made up of numerous channels with consecutive numbers. This hierarchy in the use of the bits in the initial address AI' leads to successively consider three steps: the fields VPI and L; then the VCI field; and then the channel attribute field CA.

In FIG. 4, the twelve bits of the VPI field are shown in the form of three half-bytes n0, n1, n2. The sixteen bits in the VCI field are represented in the form of four half-bytes n3, . . . , n6. The four bits of the field CA are represented in the form of a half-byte n7. The two bits in the LI field are labelled L. In this example, the node considered has inputs for four links. The LI field can therefore take four values.

A first step E1' consists in extracting each initial address AI' which has 34 bits, the two bits L of the link number, LI. These two bits are used as selection address AS' to address a memory MFi' which contains four words of three bits, M1' each of which defines a mask to extract a series of bits from the VPI field. Each mask includes twelve bits. Each bit of the word M1' represents one fourth of the mask: one bit with value 0 representing 0000, and one bit with value 1 representing 1111. In the example shown in FIG. 4, the word M1'=101 represents a mask which eliminates the half-byte n1 and extracts the half-bytes n0 and n2 from the VPI field.

The following operation, labelled 2', consists in compressing the bits extracted from the VPI field to form a relative address AV1' which can include in this example up to 14 bits. The address AV1' is added, through the operation referenced 3' to a basic address AB1' to obtain a reduced address value AT1'.

In this example, all of the initial address values AI' include four subsets of 256 consecutive values, when a given value of the LI field which identifies an input link is considered. The consecutive values of each subset are due to value changes of eight bits among the 12 bits in the VPI field. For this reason each mask defined by a word M1' selects 8 bits in the VPI field.

The relative addresses AV1' obtained have values which range from 0 to 255 for each subset. The relative addresses AV1' which correspond to a first subset do not need to be translated. It suffices to take a basic address AB1' equal to 0. The reduced addresses AT1' which correspond to the first subset therefore range from 0 to 255.

The relative addresses AV1' which correspond to a second subset must be translated from 256 so that the reduced addresses AT1' obtained in this way are joined with those obtained for the first subset. The basic address AB1' is then taken equal to 256 for the second subset. The reduced addresses AT1' which correspond to the second subset therefore range from 256 to 511.

The relative addresses AV1' which correspond to a third subset must be translated from 512 so that the reduced addresses AT1' obtained in this way are joined with those obtained for the third subset. The basic address AB1' is then taken equal to 512 for the second subset. The AT1' reduced addresses which correspond to the third subset therefore range from 512 to 767.

The relative addresses AV1' which correspond to a fourth subset must be translated from 768 so that the reduced addresses AT1' obtained in this way are joined with those obtained for the fourth subset. The basic address AB1' is then taken equal to 768 for the third subset. The reduced addresses AT1' which correspond to the fourth subset therefore range from 768 to 1023.

In this example of an application, it is not necessary to address a basic address memory to obtain a basic address value ABI' for each value in the series of bits extracted from the initial address AI'. The basic address AB1' is taken equal to the value L of the LI field followed by 8 bits, 0000 0000, of lesser significance. The decimal value of the binary word formed in this way is respectively: 0, 256, 512, 768, for L=00, 01, 10, 11. Operation 3' provides a reduced address AT1' which includes 14 bits.

It should be noted that, in this application, the method according to the invention can be applied in another way for this first step E1'. All of the initial address values AI' include 256 subsets formed by 4 consecutive values when the four potential values of the LI field are considered for each of the 256 values taken by the VPI field. It is therefore possible to extract the two bits from the LI field to form a relative address AT1'=L capable of taking the values 0, 1, 2 and 3; and to translate each of these 256 series of four values using 256 AB1' basic addresses. The mask which selects the two bits in the LI field is always the same; consequently, it is not necessary to provide a format memory. However, it is necessary to provide a basic address memory which is addressed by the 12 bits of the VPI field, and which contains the 256 basic address values: 0, 4, 8, 12, 16, . . . , 1020.

Step E2' consists in addressing a format memory MF2' and a basic address memory, MA2', using the reduced address AT1'. Memory MF2' stores four-bit binary words, M2' each of which defines a format for extracting a series of bits among the 16 bits in the VCI field. The bits are extracted through a 16 bit mask. Each bit represents one fourth of the mask, one bit of value 0 representing 0000, and one bit of value 1 representing 1111. In the example shown in FIG. 4, memory MF2' provides a binary word M2'=1010 which represents a mask that enables the half-bytes n3 and n5 to be selected in the VCI field. An operation referenced 5' then consists in compressing these half-bytes to form a relative address AV2' which therefore includes eight bits in this example, and which in all cases never exceeds sixteen bits, the number of bits in the VCI field.

Concurrently, the basic address memory MA2' provides a basic address AB2' which includes 22 bits associated with the word M2'. Operation 5' then consists in adding each relative address AV2' to the basic address AB1' to obtain a reduced address AT2' which includes 22 bits while the initial address AI' includes 34 bits.

The basic addresses AB2' are chosen such that the series of reduced addresses AT2' obtained for each basic address has no value in common with the series of reduced addresses obtained with the other basic addresses. The choice of these basic addresses therefore depends on the way in which the values of the VCI and VPI fields are distributed.

In practice, this choice consists in:

determining the subsets of the set of VCI values which are continuous or virtually continuous; usually there is a continuous subset of VCI values for each value actually taken by the union of the fields VPI and LI;

deducing, for each subset, the bits of the VCI field which vary and those which do not vary;

using, for each subset, the bits which vary to form relative address values that always commence with the value 0; in other words, to form a mask which selects only these bits; and considering successively each subset; taking for the basic address associated with its mask the largest reduced address value which corresponds to the subset considered immediately before, if any; otherwise taking a basic address equal to 0; then computing the largest reduced address value which corresponds to the subset considered, adding to it one unit to obtain the basic address. The largest reduced address value is computed by adding the last previously computed basic address and the maximum relative address value which can be obtained using the considered mask.

The third step E3' first consists in reading a format memory MF3' and a basic address memory MA3' at the address AT2' to read there respectively a mask M3' and a basic address AB3'. Mask M3' includes four bits and is stored directly in this form in memory MF3'. In the example illustrated, mask M3' is formed by the binary word 1100 and enables the extraction of the first two bits of the half-byte n7 which forms the channel attribute field CA in the initial address AI'. In this example, the two extracted bits are those which identify the type of data transmitted in the cell with the considered header. The two extracted bits, b1 and b2, are then compressed through the operation referenced 6' to form a relative address AV3'.

The basic address AB3' provided by memory MA3' includes 14 bits. It is added to the relative address AV3' through operation 7' to obtain a reduced address AT3' which includes only 14 bits, while the second reduced address AT2' provided by the second step E2' includes 22 bits, while the initial address AI' includes 34 bits.

The basic addresses AB3' are chosen in a manner similar to the one described above for the basic addresses AB2' by considering the distribution of the values taken by the field CA, for each value actually taken by the union of the VPI, VCI and LI fields.

The MF1', MF2' and MF3' format memories and the MA2' and MA3' basic address memories can be conventional random access memories, since there is no problem of size or speed. Since the reduced address AT3' includes only 14 bits instead of 34, it is therefore possible to use for the translation memory a random access memory containing the translations of the headers and the data required for the routing of each cell. The 2', 4' and 6' bit compressing operations can be carried out using conventional multiplexers. The 3', 5' and 7' adding operations can be carried out using conventional adders.

In the application to the translation of the cell headers, an alternative is to translate at the input of the first node in the network, at the interface between the network and the user. In this case, the VPI field includes only eight bits, which simplifies the reduction of the number of bits to some extent.

Another alternative is for the case of a node which transmits one or several radial links while being transparent for the channels, that is, by retransmitting all the channels of the same radial link to the same output link without modifying the content of the VCI field. In this case, the reduction of the number of bits is simplified, since it suffices to reduce only the number of bits in the VPI field to address a translation memory, and to transmit the VCI field without translation.

The scope of the invention is not restricted to the examples of use described above.

The number of steps required to reduce the number of bits in an initial address varies according to the application, since this number depends on the number of hierarchical levels which characterize the configuration of the fields that make up the initial address.

For example, another application is to reduce the number of bits of the identifier for a terminal or an application in a telecommunications network. CCITT recommendation E164 defines this identifier as a series of sixteen decimal digits or sixteen fields of four bits. These sixteen independent fields enable up to sixteen separate hierarchical levels to be formed in the addressing field, which therefore enable up to sixteen steps to be formed to reduce the number of bits for this identifier.

Various alternatives are possible for the extraction of a series of bits in the initial address. It is possible to store a mask which includes as many bits as the field to be masked, but it is also possible to store a lesser number of bits which nevertheless represents the format of the bits to be extracted, for example by indicating the rank of the first bit to be extracted and the rank of the last bit to be extracted for each of the series of consecutive bits to be extracted from the initial address.

We claim:

1. A method for reducing the number of bits in an initial address digital signal (AI) which represents a series of addresses, the method having at least a first step (E1) which consists successively of:

extracting from each initial address digital signal (AI) at least one partial initial address digital signal (C1);

forming a selection address digital signal (AS) from partial initial address digital signal (C1);

extracting from each initial address digital signal (AI) a masked partial address digital signal (C3, C6) using a mask format digital signal (M1,i) selected from multiple predetermined first mask format digital signals (M1,1; M1,2; M1,3; M1,4) as a function of the selection address digital signal (AS);

forming from the masked partial address digital signal (C3, C6) a first relative address digital signal (AV1); and adding the first relative address digital signal (AV1) to a predetermined basic address digital signal (AB(M1,i)) associated with the mask format digital signal (M1,i) selected to determine the first relative address digital signal (AV1), for providing a first reduced address digital signal (AT1) with a smaller number of bits than the one in the initial address digital signal (A1); and determining the predetermined basic address digital signal (AB(M1,i)) associated with the mask format digital signal (M1,i) by:

taking logical "0" value for the predetermined basic address digital signal (AB(M1,i) associated with the first mask format signal (M1,i) a maximum first relative address value which can be obtained using the first reduced address digital signal (AT1) incremented by one unit; and determining a successive reduced address digital signal (AT(j)); and successively taking for a logical value of each successive predetermined basic address digital signal (AB(Mj,k)) associated respectively with a successive mask format digital signal (Mj,k), a sum of a previous predetermined basic address digital signal (AB(Mj−1,k)) determined for a previous reduced address digital signal AT(j−1) and a maximum relative address value which can be obtained using the previous reduced address digital signal AT(j−1) incremented by one unit.

2. A method according to claim 1, wherein the method also includes n−1 successive steps, where n is at least equal to 2; and in that a jth step, where j ranges between 2 and n, consists of:

extracting from each initial address digital signal (AI) a jth series of digital signals (C2, C4) using the successive mask format digital signal (Mj,k) selected from multiple predetermined jth format digital signals such that the jth series of digital signals (C2, C4) has a smaller number of bits than the number of bits in the previous reduced address digital signal (AT(j−1)) provided by the j−1th step, a selected successive mask format digital signal (Mj,k) being determined using the previous reduced address digital signal (AT(j−1)) provided by the j−1th step;

forming a jth relative address digital signal (AVj) with the jth series of digital signals (C2, C4); and adding the jth relative address digital signal (AVj) and the predetermined basic address digital signal (AB(Mj,k)) associated with the selected successive mask format digital signal (Mj,k) to obtain a jth reduced address digital signal (ATj) which replaces the initial address digital signal (AI) and has a number of bits smaller than that of the j−1th reduced address digital signal (AT(j−1));

and determining the predetermined basic address digital signal (AB(Mj,k)) associated with one of the selected successive mask format digital signal (Mj,k) in a jth format by:

taking a logical value "0" for the predetermined basic address digital signal (AB(Mj,k)) associated with a first selected successive mask format digital signal (Mj,k) considered from the jth format; and taking for the logical value of each address digital signal (AB(Mj,k)), respectively with other jth formats, the sum of a last basic address digital signal (AB(Mj,k)) determined for a previously considered jth format, and a maximum relative address value which can be obtained using the jth format incremented by one unit.

3. A method as claimed in claim 2 for reducing the number of bits in an initial address (AI') formed by a link number and an asynchronous time division multiplexing transmission cell header, where the header includes a virtual radial link identification field digital signal (VPI), a virtual channel identification field digital signal (VCI), and a channel attribute field digital signal (CA), each radial link being a set of channels, the method further comprising at least two steps (E'1, E'2), as follows:

forming each selection address digital signal (AS') by extracting from each initial address digital signal (AI') the link number digital signal (LI);

forming each first relative address digital signal (AT'1) by extracting from each initial address digital signal (AI') a series of radial link identification digital signals (n0, n2) which belong to the radial link identification field digital signal (VPI);

determining a first basic addresses digital signal (AB1') associated respectively with a first format digital signal (MF1') which correspond respectively to a selection address digital signal (AS') by directly joining the selection address digital signal (AS') with lesser significance bits having a logical value "0" (0000 0000); and forming each second relative address digital signal (AV'2) by extracting from each initial address digital signal (AI') a series of virtual channel identification digital signals (n3, n5) which belong to the virtual channel identification field digital signal (VCI).

4. A method according to claim 3, wherein the method also includes a third step (E3') of forming each third relative address digital signal (AV3') by extracting from each initial address digital signal (AI') a series of channel attribute digital signals (b1, b2) from the channel attribute field digital signal (CA).

5. A method in an asynchronous time division multiplexing telecommunication network for reducing a number of bits in an initial address digital signal (AI) which represents a series of addresses into at least one reduced address digital output signal (AT1) that forms a read-write address for a translation table, the method having at least a first step (E1) which consists successively of:

extracting from each initial address digital signal (AI) at least one partial initial address digital signal (C1);

forming a selection address digital signal (AS) from partial initial address digital signal (C1);

extracting from each initial address digital signal (AI) a masked partial address digital signal (C3, C6) using a mask format digital signal (M1,i) selected from multiple predetermined first mask format digital signals (M1,1; M1,2; M1,3; M1,4) as a function of the selection address digital signal (AS);

forming from the masked partial address digital signal (C3, C6) a first relative address digital signal (AV1); and adding the first relative address digital signal (AV1) to a predetermined basic address digital signal (AB(M1,i)) associated with the mask format digital signal (M1,i) selected to determine the first relative address digital signal (AV1), for providing a first reduced address digital signal (AT1) with a smaller number of bits than the one in the initial address digital signal (A1); and determining the predetermined basic address digital signal (AB(M1,i)) associated with the mask format digital signal (M1,i) by:

taking logical "0" value for the predetermined basic address digital signal (AB(M1,i) associated with the first mask format signal (M1,i) a maximum first relative address value which can be obtained using the first reduced address digital signal (AT1) incremented by one unit; and determining a successive reduced address digital signal (AT(j)); and successively taking for a logical value of each successive predetermined basic address digital signal (AB(Mj,k)) associated respectively with a successive mask format digital signal (Mj,k), a sum of a previous predetermined basic address digital signal (AB(Mj−1,k)) determined for a previous reduced address digital signal AT(j−1) and a maximum relative address value which can be obtained using the previous reduced address digital signal AT(j−1) incremented by one unit.

* * * * *

UNITED STATES PATENT AND TRADEMARK OFFICE
CERTIFICATE OF CORRECTION

PATENT NO. : 5,481,687
DATED : Jan. 2, 1996
INVENTOR(S) : Goubert et al.

It is certified that error appears in the above-indentified patent and that said Letters Patent is hereby corrected as shown below:

At column 13, line 39, through column 15, line 17, delete claims 1-3 and replace as they should read:

1. A method for transforming an initial address digital signal (AI) which represents a series of address locations in a memory having a translation table into at least one reduced address digital output signal (AT1, ..., AT(j-1), AT(j)) for accessing a significantly reduced number of address locations in the memory, the method having at least a first step (E1) which consists successively of:
 extracting from each initial address digital signal (AI) at least one partial initial address digital signal (C1);
 forming a selection address digital signal (AS) from said at least one partial initial address digital signal (C1);
 extracting from each initial address digital signal (AI) a masked partial address digital signal (C3, C6) using a mask format digital signal (M1,i) selected from multiple predetermined first mask format digital signals (M1,1; M1,2; M1,3; M1,4) as a function of the selection address digital signal (AS);
 forming from the masked partial address digital signal (C3, C6) a first relative address digital signal (AV1);
 adding the first relative address digital signal (AV1) to a predetermined basic address digital signal (AB(M1,i)) associated with the mask format digital signal (M1,i) selected to determine the first relative address digital signal (AV1), for providing a first reduced address digital signal (AT1)

UNITED STATES PATENT AND TRADEMARK OFFICE
CERTIFICATE OF CORRECTION

PATENT NO. : 5,481,687
DATED : Jan. 2, 1996
INVENTOR(S) : Goubert et al.

It is certified that error appears in the above-indentified patent and that said Letters Patent is hereby corrected as shown below:

representing a first reduced address location in the memory; and
    determining the predetermined basic address digital signal (AB(M1,i)) associated with the mask format digital signal (M1,i) by:
        taking a logical "0" value for the predetermined basic address digital signal (AB(M1,i) associated with the first mask format signal (M1,i) and obtaining a first maximum relative address signal representing a first maximum address location in the memory by incrementing the first reduced address digital signal (AT1) by a logical "1" value, for accessing a first reduced subset of address locations in the memory;
        determining a successive reduced address digital signal (AT(j)) representing a successive reduced address location in the memory; and
        successively summing for each successive predetermined basic address digital signal (AB(Mj,k)) associated respectively with a successive mask format digital signal (Mj,k), a previous predetermined basic address digital signal (AB(Mj-1,k)) determined for a previous reduced address digital signal AT(j-1) and a maximum relative address signal representing a maximum relative address location in the memory by incrementing the previous reduced address digital signal AT(j-1) by a logical "1" value, for accessing a successive reduced

UNITED STATES PATENT AND TRADEMARK OFFICE
CERTIFICATE OF CORRECTION

PATENT NO. : 5,481,687
DATED : Jan. 2, 1996
INVENTOR(S) : Goubert et al.

It is certified that error appears in the above-indentified patent and that said Letters Patent is hereby corrected as shown below:

subset of address locations in the memory.

2. A method according to claim 1, wherein the method also includes n-1 successive steps, where n is at least equal to 2; and in that a jth step, where j ranges between 2 and n, consists of:

extracting from each initial address digital signal (AI) a jth series of digital signals (C2, C4) using the successive mask format digital signal (Mj,k) selected from multiple predetermined jth format digital signals such that the jth series of digital signals (C2, C4) accesses a smaller number of addressable locations in the memory than the previous reduced address digital signal (AT(j-1)) provided by the j-1th step, and determining a selected successive mask format digital signal (Mj,k) using the previous reduced address digital signal (AT(j-1)) provided by the j-1th step;

forming a jth relative address digital signal (AVj) with the jth series of digital signals (C2, C4);

adding the jth relative address digital signal (AVj) and the predetermined basic address digital signal (AB(Mj,k)) associated with the selected successive mask format digital signal (Mj,k) to obtain a jth reduced address digital signal (ATj) representing a jth address location in the memory which replaces the initial address digital signal (AI) and accesses a smaller number of addressable locations than that of the j-1th reduced address digital signal (AT(j-1)); and determining the predetermined basic address digital signal (AB(Mj,k)) associated with the selected successive mask format digital signal (Mj,k) in a jth format by:

UNITED STATES PATENT AND TRADEMARK OFFICE
CERTIFICATE OF CORRECTION

PATENT NO. : 5,481,687
DATED : Jan. 2, 1996
INVENTOR(S) : Goubert et al.

It is certified that error appears in the above-indentified patent and that said Letters Patent is hereby corrected as shown below:

taking a logical value "0" for the predetermined basic address digital signal (AB(Mj,k)) associated with a first selected successive mask format digital signal (Mj,k) considered from the jth format; and
    summing for each address digital signal (AB(Mj,k)), respectively with other jth formats, a last basic address digital signal (AB(Mj,k)) determined for a previously considered jth format, and a maximum relative address signal representing a maximum relative address location in the memory by incrementing the jth format incremented by a logical "1" value.

3. A method as claimed in claim 2, wherein the address digital signal (AI) represents an initial address (AI') formed by a link number and an asynchronous time division multiplexing transmission cell header, wherein the header includes a virtual radial link identification field digital signal (VPI), a virtual channel identification field digital signal (VCI), and a channel attribute field digital signal (CA), each radial link being a set of channels,
    and wherein the method further comprising at least two steps (E'1, E'2), as follows:
    forming each selection address digital signal (AS') by extracting from each initial address digital signal (AI') the link number digital signal (LI);
    forming each first relative address digital signal (AT'1) by extracting from each initial address digital signal (AI') a series of radial link identification

UNITED STATES PATENT AND TRADEMARK OFFICE
CERTIFICATE OF CORRECTION

PATENT NO. : 5,481,687
DATED : Jan. 2, 1996
INVENTOR(S) : Goubert et al.

It is certified that error appears in the above-indentified patent and that said Letters Patent is hereby corrected as shown below:

digital signals (n0, n2) which belong to the radial link identification field digital signal (VPI);

determining a first basic addresses digital signal (AB1') associated respectively with a first format digital signal (MF1') which correspond respectively to a selection address digital signal (AS') by directly joining the selection address digital signal (AS') with lesser significance bits having a logical value "0" (0000 0000); and forming each second relative address digital signal (AV'2) by extracting from each initial address digital signal (AI') a series of virtual channel identification digital signals (n3, n5) which belong to the virtual channel identification field digital signal (VCI).

UNITED STATES PATENT AND TRADEMARK OFFICE
CERTIFICATE OF CORRECTION

PATENT NO. : 5,481,687
DATED : Jan. 2, 1996
INVENTOR(S) : Goubert et al.

It is certified that error appears in the above-indentified patent and that said Letters Patent is hereby corrected as shown below:

At column 15, line 24, through column 16, line 33, delete claim 5 and replace as it should read:

5. A method in an asynchronous time division multiplexing telecommunication network for transforming an initial address digital signal (AI) which represents a series of addresses in a header of an asynchronous time division multiplexing telecommunication signal for establishing a link between two nodes in the asynchronous time division multiplexing telecommunication network into at least one reduced address digital output signal (AT1, ..., AT(j-1), AT(j)) for accessing a reduced number of address locations in a memory containing a translation table that forms a read-write address signal for the memory, the method having at least a first step (E1) which consists successively of:

extracting from each initial address digital signal (AI) at least one partial initial address digital signal (C1);

forming a selection address digital signal (AS) from said at least one partial initial address digital signal (C1);

extracting from each initial address digital signal (AI) a masked partial address digital signal (C3, C6) using a mask format digital signal (M1,i) selected from multiple predetermined first mask format digital signals (M1,1; M1,2; M1,3; M1,4) as a function of the selection address digital signal (AS);

forming from the masked partial address digital signal (C3, C6) a first relative address digital signal (AV1);

UNITED STATES PATENT AND TRADEMARK OFFICE
CERTIFICATE OF CORRECTION

PATENT NO. : 5,481,687
DATED : Jan. 2, 1996
INVENTOR(S) : Goubert et al.

It is certified that error appears in the above-indentified patent and that said Letters Patent is hereby corrected as shown below:

adding the first relative address digital signal (AV1) to a predetermined basic address digital signal (AB(M1,i)) associated with the mask format digital signal (M1,i) selected to determine the first relative address digital signal (AV1), for providing a first reduced address digital signal (AT1) representing a first reduced address location in the memory; and
    determining the predetermined basic address digital signal (AB(M1,i)) associated with the mask format digital signal (M1,i) by:
        taking a logical "0" value for the predetermined basic address digital signal (AB(M1,i) associated with the first mask format signal (M1,i) and obtaining a first maximum relative address signal representing a first maximum relative address location in the memory by incrementing the first reduced address digital signal (AT1) by a logical "1" value, for accessing a first reduced subset of address locations in the memory;
        determining a successive reduced address digital signal (AT(j)) representing a successive reduced address location in the memory; and
        successively summing for each successive predetermined basic address digital signal (AB(Mj,k)) associated respectively with a successive mask format digital signal (Mj,k), a previous predetermined basic address digital signal (AB(Mj-1,k)) determined for a previous reduced address digital signal AT(j-1) and a maximum relative address signal representing a maximum relative address location in the memory

UNITED STATES PATENT AND TRADEMARK OFFICE
CERTIFICATE OF CORRECTION

PATENT NO. : 5,481,687
DATED : Jan. 2, 1996
INVENTOR(S) : Goubert et al.

It is certified that error appears in the above-indentified patent and that said Letters Patent is hereby corrected as shown below:

```
which can be obtained using the previous
reduced address digital signal AT(j-1)
incremented by a logical "1" value, for
accessing a successive reduced subset of
memory locations in the memory.
```

Signed and Sealed this

Twenty-fourth Day of September, 1996

Attest:

BRUCE LEHMAN

Attesting Officer

Commissioner of Patents and Trademarks